(12) United States Patent
Hsieh et al.

(10) Patent No.: US 9,377,890 B2
(45) Date of Patent: Jun. 28, 2016

(54) MULTI-TOUCH METHOD FOR RESISTIVE TOUCH PANEL

(75) Inventors: Yao-Jen Hsieh, Hsin-Chu (TW);
Chih-Wei Chen, Hsin-Chu (TW);
Hai-En Tsai, Hsin-Chu (TW); Jia-Lang Hsu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 1856 days.

(21) Appl. No.: 12/550,404

(22) Filed: Aug. 31, 2009

(65) Prior Publication Data

US 2010/0283748 A1 Nov. 11, 2010

(30) Foreign Application Priority Data

May 11, 2009 (TW) ................................ 98115548 A (51) Int. Cl.
*G06F 3/041* (2006.01)
(52) U.S. Cl.
CPC .... *G06F 3/0416* (2013.01); *G06F 2203/04808* (2013.01)
(58) Field of Classification Search
None
See application file for complete search history.

(56) References Cited

U.S. PATENT DOCUMENTS

| 2008/0036743 | A1 | 2/2008 | Westerman et al. | |
| 2009/0231281 | A1* | 9/2009 | Whytock et al. | 345/168 |
| 2009/0251434 | A1* | 10/2009 | Rimon et al. | 345/173 |
| 2010/0020025 | A1* | 1/2010 | Lemort et al. | 345/173 |
| 2010/0090971 | A1* | 4/2010 | Choi et al. | 345/173 |
| 2010/0162181 | A1* | 6/2010 | Shiplacoff et al. | 715/863 |
| 2010/0201634 | A1* | 8/2010 | Coddington | 345/173 |

FOREIGN PATENT DOCUMENTS

| CN | 101231450 A | 7/2008 |
| CN | 101379461 A | 3/2009 |
| TW | 200847001 | 12/2008 |
| TW | 200905539 | 2/2009 |

OTHER PUBLICATIONS

Chun-Ting Liu; Yao-Jen Hsieh; Fu-Chen Fan, "Method for Recognizing Gestures on Liquid Crystal Display Apparatus With Touch Input Function", U.S. Appl. No. 12/420,487, filed Apr. 8, 2009.

\* cited by examiner

*Primary Examiner* — Joseph Feild
*Assistant Examiner* — Emily Frank
(74) *Attorney, Agent, or Firm* — Winston Hsu; Scott Margo (57) ABSTRACT

When operating a resistive touch panel, a first command is issued by touching the touch panel using a finger. When the finger remains in contact with the touch panel, a second command is issued by touching the touch panel using a stylus. Therefore, a corresponding gesture operation can be executed in multi-touch applications after identifying the first and second commands.

34 Claims, 13 Drawing Sheets

MULTI-TOUCH METHOD FOR RESISTIVE TOUCH PANEL

BACKGROUND OF THE INVENTION

1. Field of the Invention

The present invention is related to a multi-touch method for resistive touch panel, and more particularly, to a multi-touch method for resistive touch panel using a finger and a stylus as input devices.

2. Description of the Prior Art

Liquid crystal display (LCD) devices with thin appearance have gradually replaced traditional bulky cathode ray tube (CRT) displays and been widely used in various electronic products. There are various types of touch panels, such as resistive, capacitive, surface acoustic or infrared. Among those, resistive touch panels detect voltage variations caused by tactile inputs. Due to low manufacturing costs, resistive touch panels are the most widespread technique and commonly used in consumer products such as personal digital assistants (PDAs), cellular phones, personal GPS devices, electronic dictionaries or household electronic products.

Figure 1:
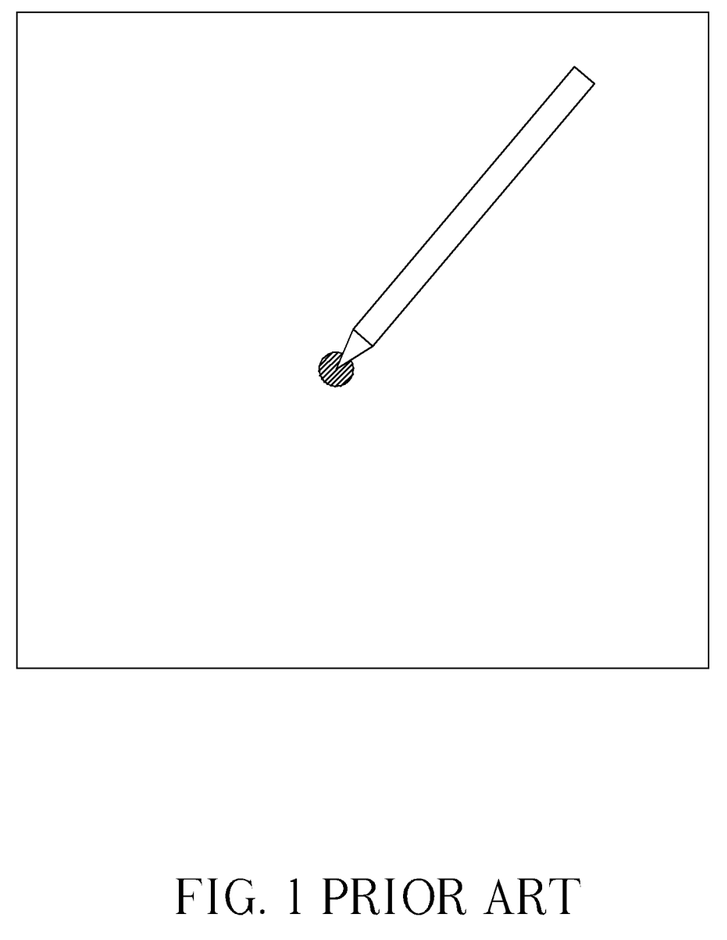
FIG. 1 is a diagram illustrating a prior art single-touch method.

Normally, a mechanical device (such as a stylus) or a part of human body (such as a finger) are the input device when manipulating a resistive touch panel. Referring to FIG. 1, which is a diagram illustrating a prior art single-touch method. In the method depicted in FIG. 1, a stylus is used for issuing commands on the resistive touch panel. The pointed design of the stylus results in a small contact point on the touch panel, and the user can move the stylus easily and swiftly. The prior art method depicted in FIG. 1 provides highly accurate tactile inputs, but can only execute a limited amount of gesture operations.

Figure 2:
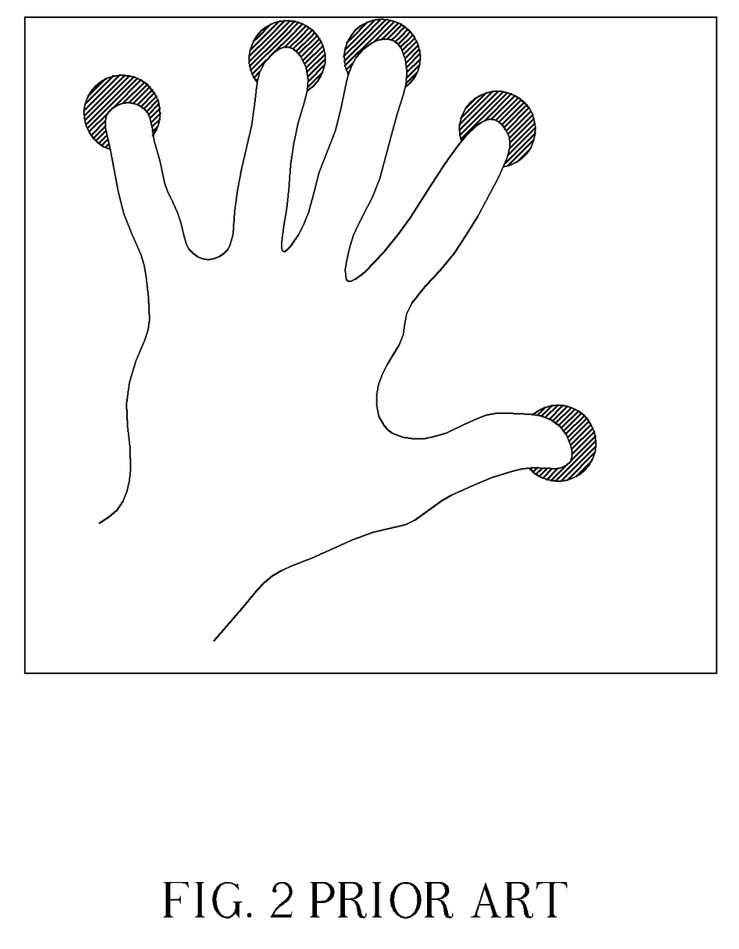
FIG. 2 is a diagram illustrating a prior art multi-touch method.

Referring to FIG. 2, which is a diagram illustrating a prior art multi-touch method. In the method depicted in FIG. 2, a human finger is used for issuing commands on a resistive touch panel so as to provide multi-touch function. The finger results in a larger contact point on the touch panel than a stylus, which makes the manipulation less swift. Therefore, although the prior art method depicted in FIG. 2 can execute more gesture operations, but is disadvantageous in sluggish manipulation and less accurate tactile inputs.

SUMMARY OF THE INVENTION

The present invention provides a multi-touch method comprising issuing a first command by touching a touch panel using a first input device; issuing a second command by touching the touch panel using a second input device while the first input device is in contact with the touch panel; and identifying the first and second commands for executing a corresponding gesture operation.

The present invention further provides a multi-touch method comprising issuing a first command by touching a touch panel using a first mechanical device; issuing a second command by touching the touch panel using a second mechanical device; and identifying the first and second commands for executing a corresponding gesture operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 5a-9a are diagrams illustrating the first embodiment of the present invention when performing a first type gesture operation.

FIGS. 5b-9b are diagrams illustrating the second embodiment of the present invention when performing the first type gesture operation.

FIGS. 10a-12a are diagrams illustrating the first embodiment of the present invention when performing a second type gesture operation.

FIGS. 10b-12b are diagrams illustrating the second embodiment of the present invention when performing the second type gesture operation.

DETAILED DESCRIPTION

Figure 3:
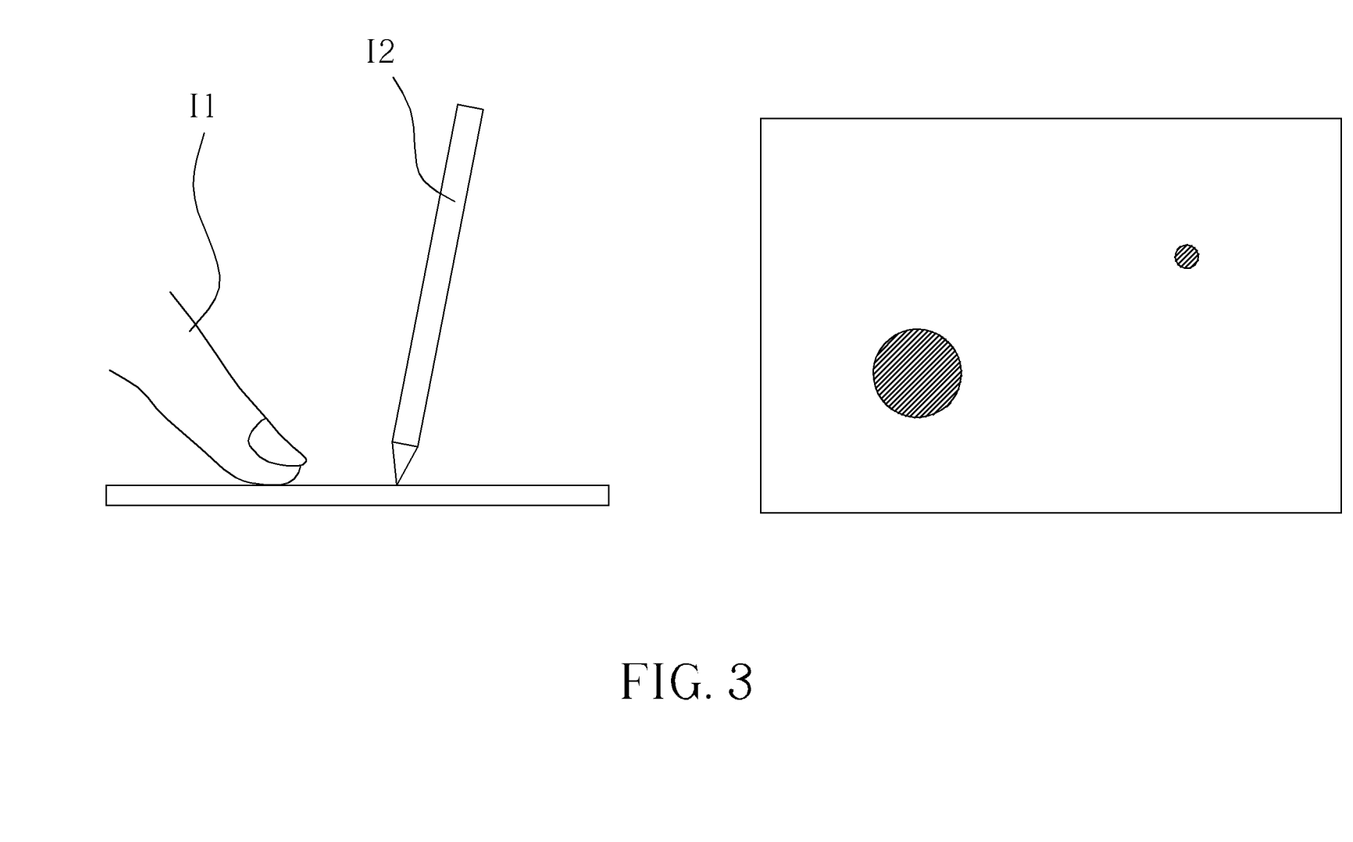
FIG. 3 is a diagram illustrating a multi-touch method according to a first embodiment of the present invention.
Figure 4:
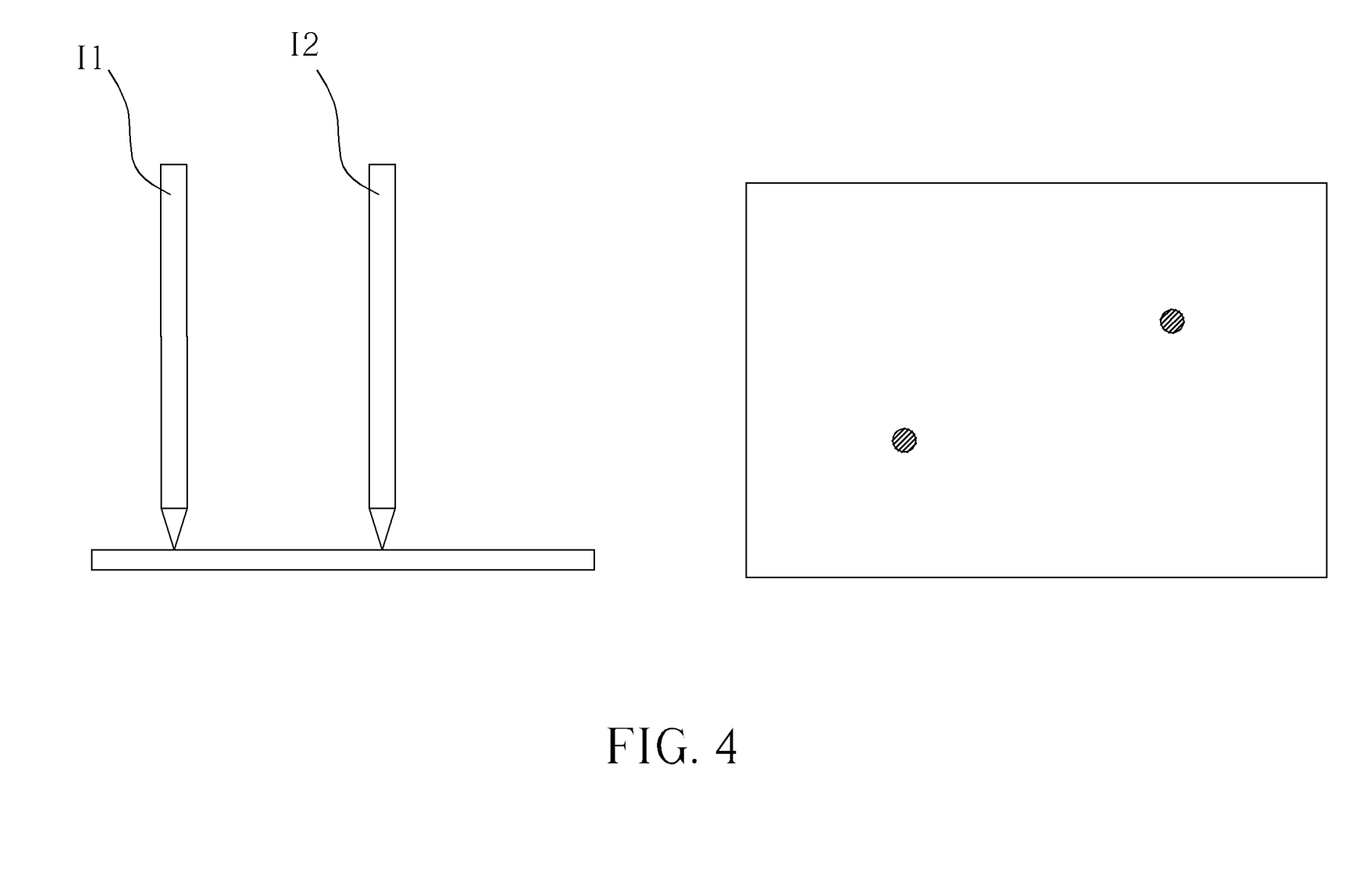
FIG. 4 is a diagram illustrating a multi-touch method according to a second embodiment of the present invention.

Referring to FIGS. 3 and 4, wherein FIG. 3 is a diagram illustrating a multi-touch method according to a first embodiment of the present invention and FIG. 4 is a diagram illustrating a multi-touch method according to a second embodiment of the present invention. In the present invention, two input devices I1 and I2 are used for issuing commands on a resistive touch panel so as to provide multi-touch function. In the first embodiment of the present invention, the first input device I1 is a finger and the second input device I2 is a stylus (as depicted on the left of FIG. 3), wherein the contact point of the finger has a larger area than that of the stylus when in contact with the touch panel (as depicted on the right of FIG. 3). In the second embodiment of the present invention, both the first and second input devices I1 and I2 are styli (as depicted on the left of FIG. 4), wherein the contact points of the two styli have the same area when in contact with the touch panel (as depicted on the right of FIG. 4).

Referring to FIGS. 5a-9a and 5b-9b, wherein FIGS. 5a-9a are diagrams illustrating the first embodiment of the present invention when performing a first type gesture operation, and FIGS. 5b-9b are diagrams illustrating the second embodiment of the present invention when performing the first type gesture operation. For the first and second embodiments of the present invention to perform the first type gesture operation, a first command is issued to the touch panel using the first input device via a first contact point, and then a second command is issued to the touch panel using the second input device via a plurality of second contact points. In other words, the first command is a static command (such as selection or positioning), while the second command is a dynamic command (such as dragging or inputting data). By identifying the relationship between the first contact point and the second contact points, the corresponding first type gesture operation can be correctly executed.

Figure 5A:
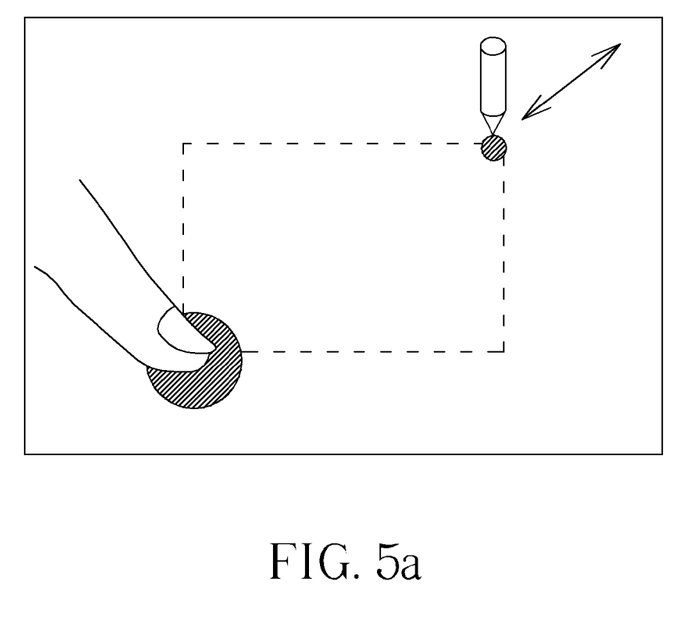
Figure 5B:
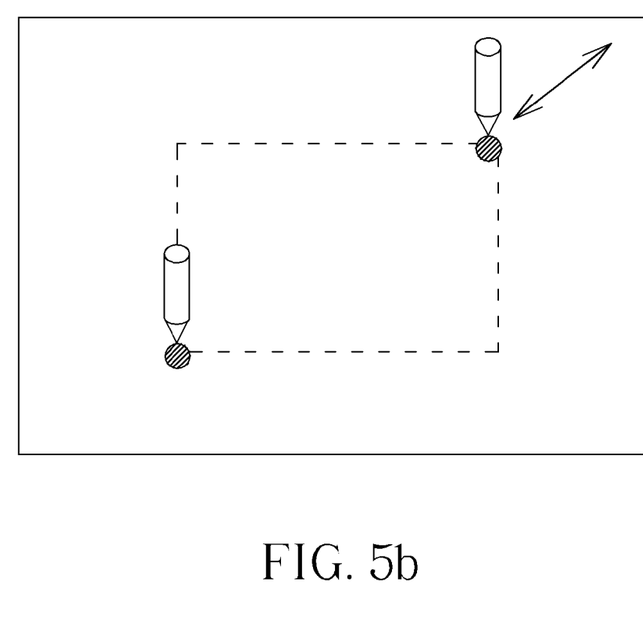

For example, in the application depicted in FIGS. 5a and 5b, the first input device is used for selecting a target object shown on the touch panel (illustrated by the dotted line in FIGS. 5a and 5b), and the second input device is used for selecting an end of the target object. The target object can thus be re-sized by moving the second input device. In this embodiment, the first command corresponds to static positioning, the second command corresponds to dynamic dragging (the direction of dragging is illustrated by the arrows in FIGS. 5*a* and 5*b*), and the first type gesture operation is related to enlarging or shrinking.

Figure 6A:
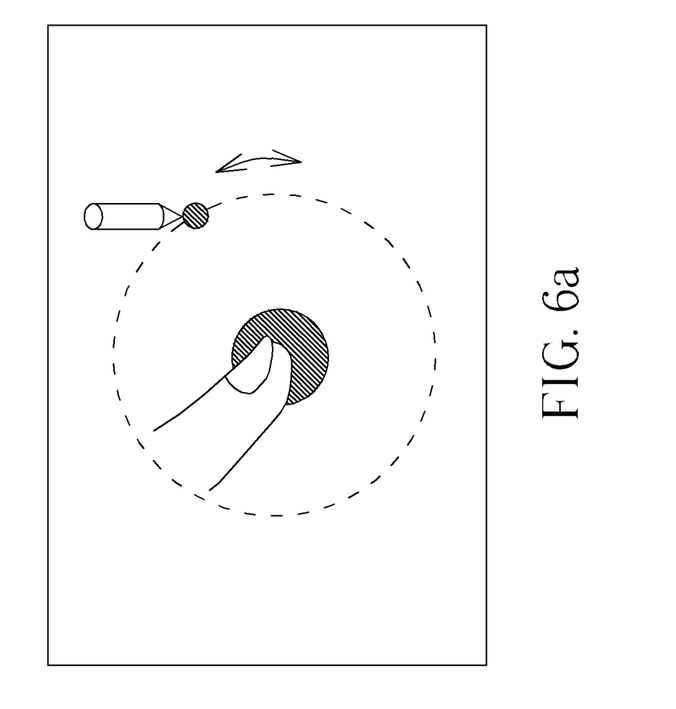
Figure 6B:
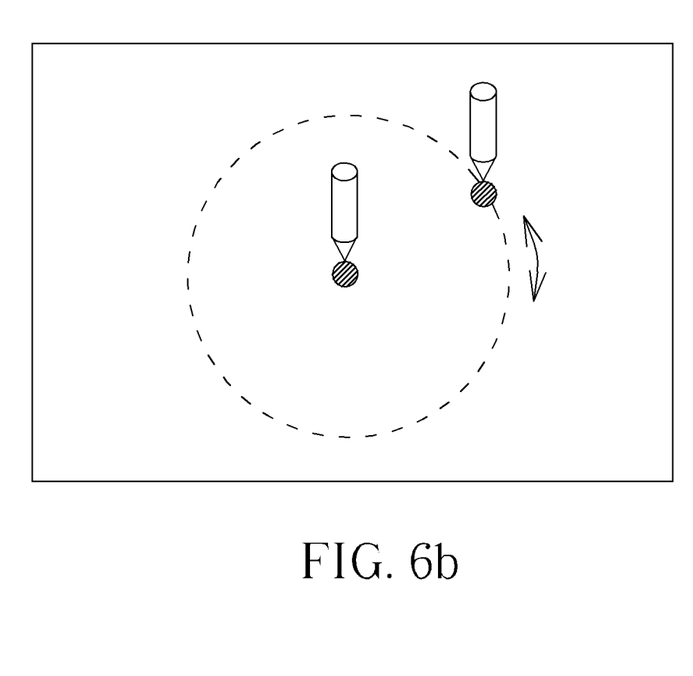

In the application depicted in FIGS. 6*a* and 6*b*, the first input device is used for selecting a target object shown on the touch panel(illustrated by the dotted line in FIGS. 6*a* and 6*b*), and the second input device is used for selecting an end of the target object. The orientation of the target object can thus be adjusted by moving the second input device. In this embodiment, the first command corresponds to static positioning, the second command corresponds to dynamic clockwise/counterclockwise rotating (the direction of rotation is illustrated by the arrows in FIGS. 6*a* and 6*b*), and the first type gesture operation is related to rotation.

Figure 7A:
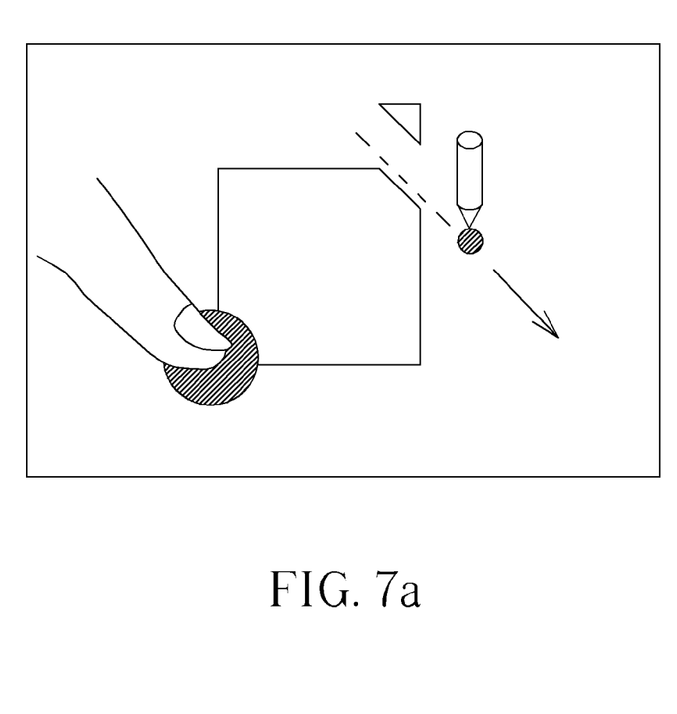
Figure 7B:
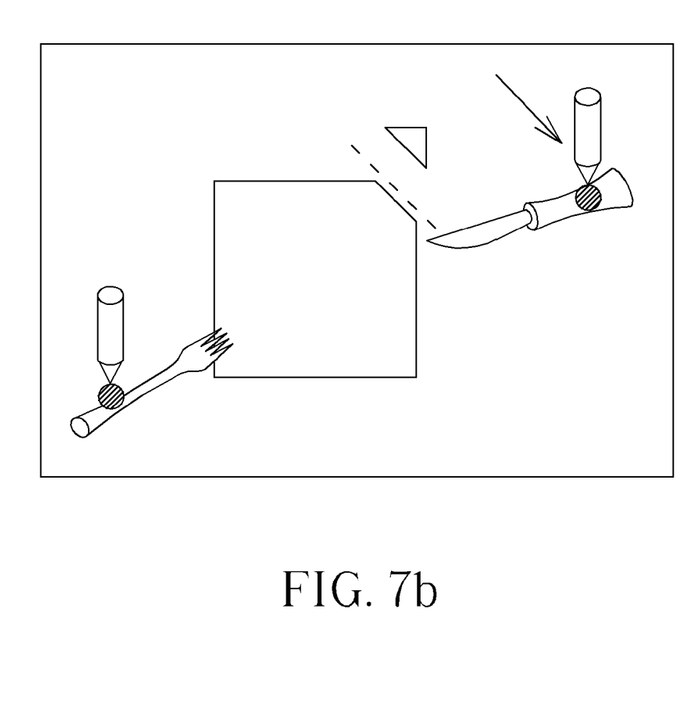

In the application depicted in FIG. 7, the first input device is used for selecting a target object shown on the touch panel, and the second input device can be moved for shaping the object, such as cutting a corner out of a square target object. Similarly, in the application depicted in FIG. 7*b*, the first input device is used for controlling a first object shown on the touch panel (such as the fork in FIG. 7*b*) in order to select an end of the target object. Next, the second input device is used for controlling a second object shown on the touch panel (such as the knife in FIG. 7*b*). The shape of the target object can thus be changed by moving the second input device, such as cutting a corner out of a square target object. In this embodiment, the first command corresponds to static selection, the second command corresponds to dynamic dragging (the direction of dragging is illustrated by the arrows in FIGS. 7*a* and 7*b*), and the first type gesture operation is related to shaping.

Figure 8A:
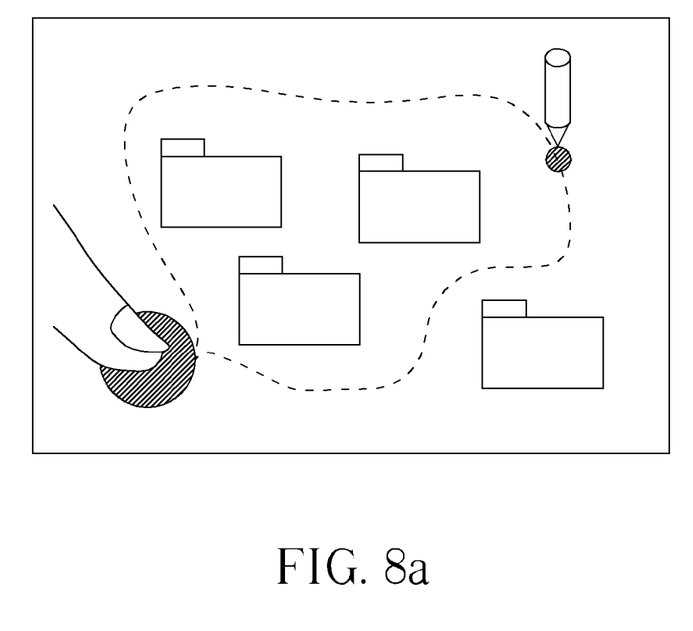
Figure 8B:
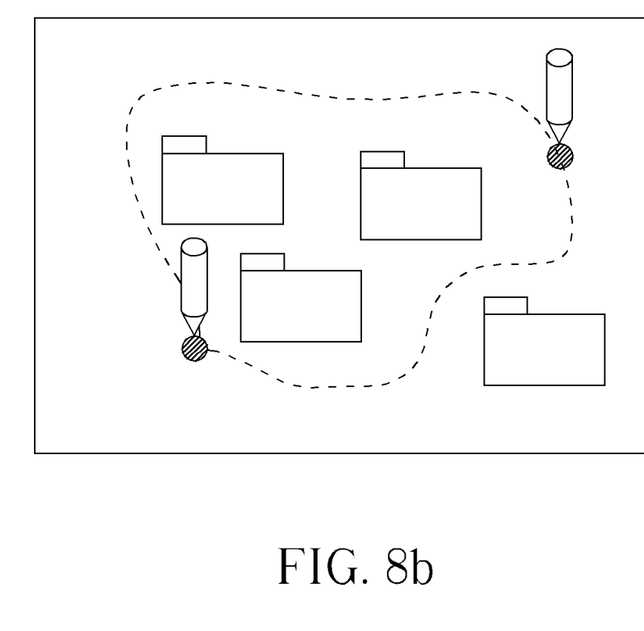

In the application depicted in FIGS. 8*a* and 8*b*, the first input device is used for selecting a start point, and the second input device is used for defining a specific range, thereby selecting all objects shown within this specific range on the touch panel. In this embodiment, the first command corresponds to static positioning, the second command corresponds to dynamic circling (the circled specific range is illustrated by the dotted line in FIGS. 8*a* and 8*b*), and the first type gesture operation is related to object selection.

Figure 9A:
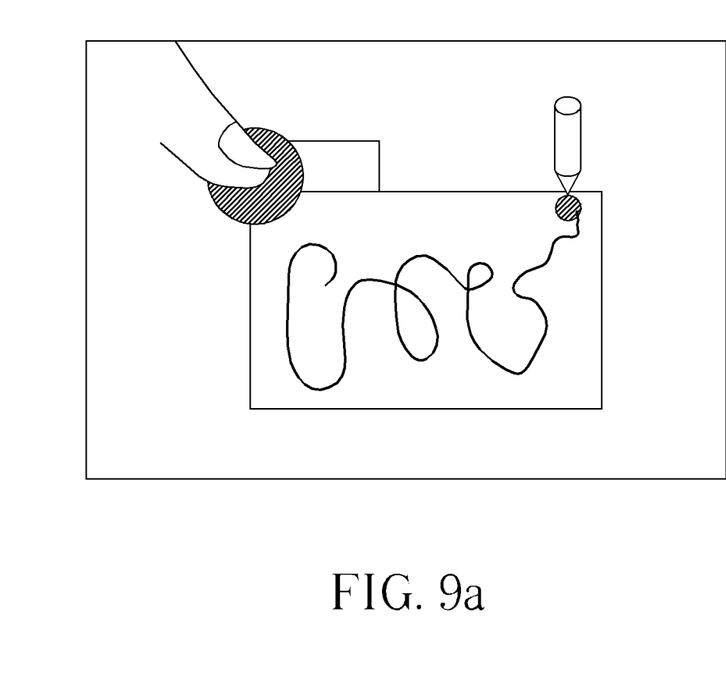
Figure 9B:
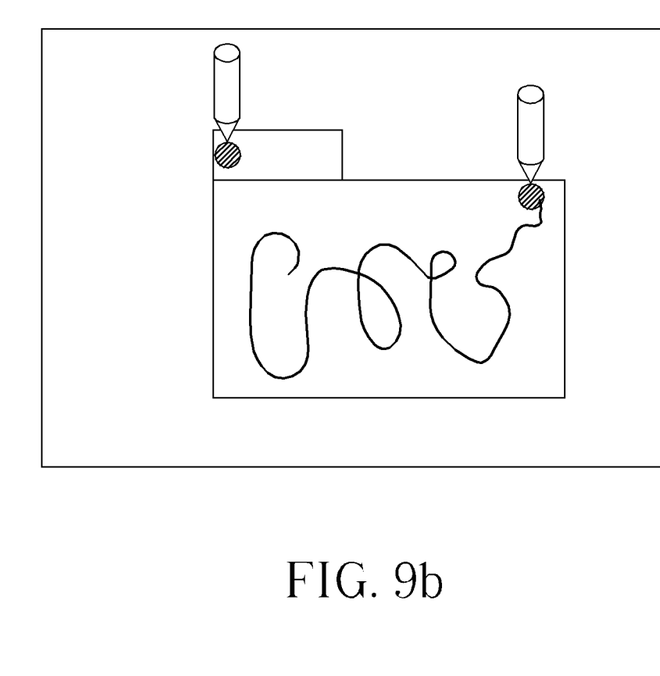

In the application depicted in FIGS. 9*a* and 9*b*, the first input device is used for selecting a target object shown on the touch panel, and the second input device is used for inputting words or patterns on the target object. In this embodiment, the first command corresponds to static selection, the second command corresponds to dynamic inputting, and the first type gesture operation is related to data input.

Referring to FIGS. 10*a*-12*a* and 10*b*-12*b*, wherein FIGS. 10*a*-12*a* are diagrams illustrating the first embodiment of the present invention when performing a second type gesture operation, and FIGS. 10*b*-12*b* are diagrams illustrating the second embodiment of the present invention when performing the second type gesture operation. For the first and second embodiments of the present invention to perform the second type gesture operation, a first command and a second command are simultaneously issued to the touch panel using the first input device via a plurality of first contact points and the second input device via a plurality of second contact points. In other words, the first and second commands are both dynamic commands (such as dragging or inputting data). By identifying the relationship between the first contact points and the second contact points, the corresponding second type gesture operation can be correctly executed.

Figure 10A:
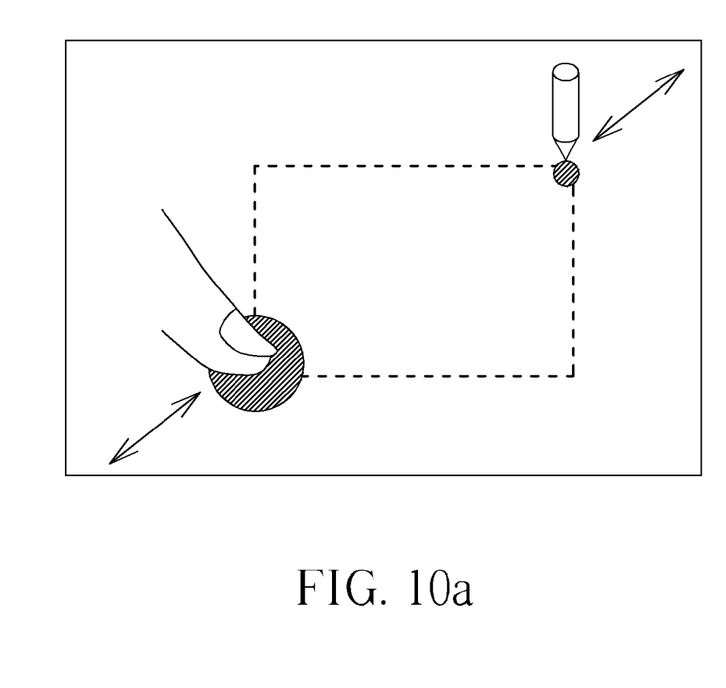
Figure 10B:
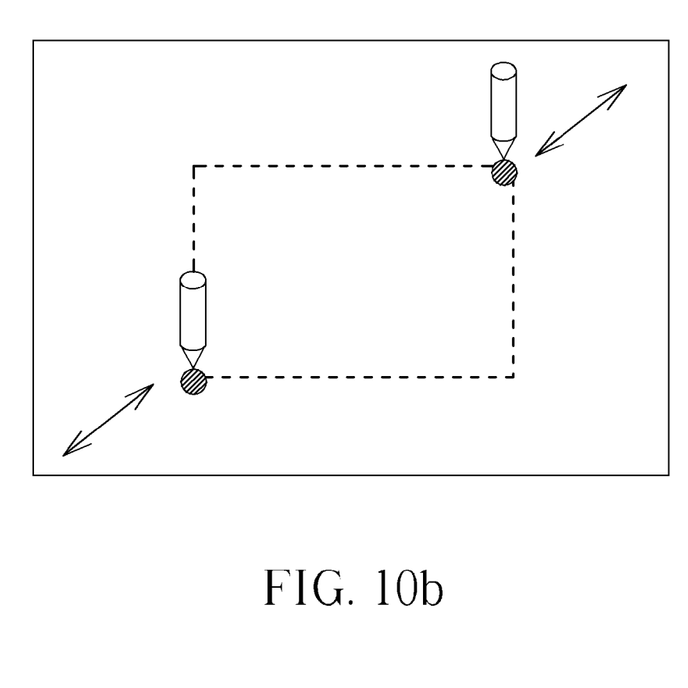

For example, in the application depicted in FIGS. 10*a* and 10*b*, the first input device is used for selecting an end of a target object shown on the touch panel (the target object is illustrated by the dotted line in FIGS. 10*a* and 10*b*), and the second input device is used for selecting another end of the target object. The target object can thus be re-sized by moving the first and second input devices simultaneously. In this embodiment, the first and second commands both correspond to dynamic dragging (the direction of dragging is illustrated by the arrows in FIGS. 10*a* and 10*b*), and the second type gesture operation is related to enlarging or shrinking.

Figure 11A:
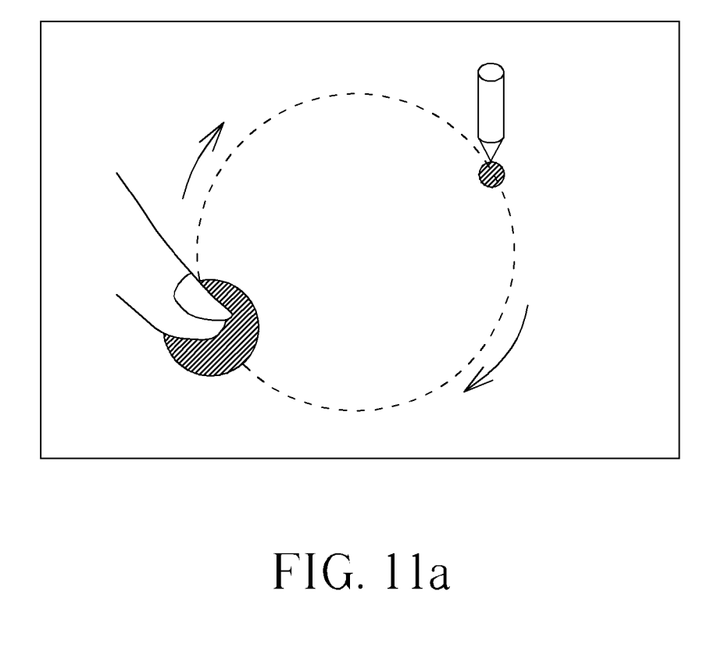
Figure 11B:
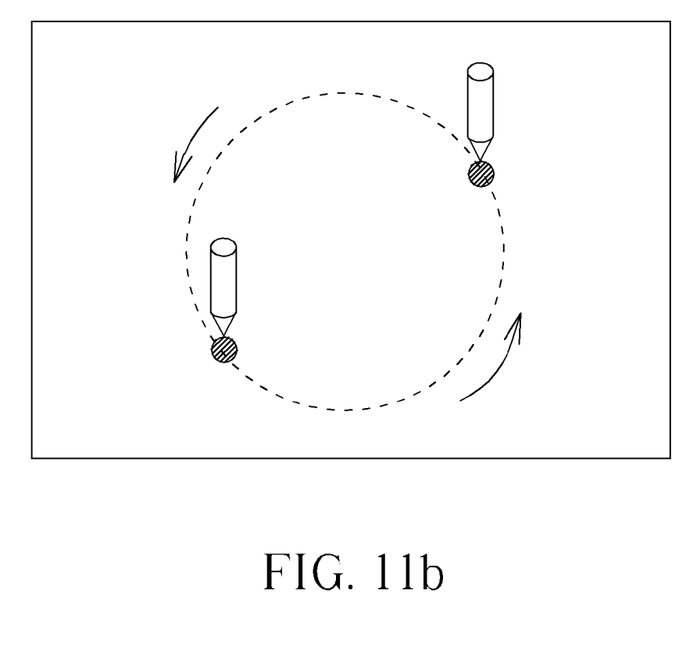

In the application depicted in FIGS. 11*a* and 11*b*, the first input device is used for selecting an end of a target object shown on the touch panel (the target object is illustrated by the dotted line in FIGS. 11*a* and 11*b*), and the second input device is used for selecting another end of the target object. The orientation of the target object can thus be adjusted by moving the first and second input devices simultaneously. In this embodiment, the first and second commands both correspond to dynamic clockwise/counterclockwise rotating (the direction of rotation is illustrated by the arrows in FIGS. 11*a* and 11*b*), and the second type gesture operation is related to rotation.

Figure 12A:
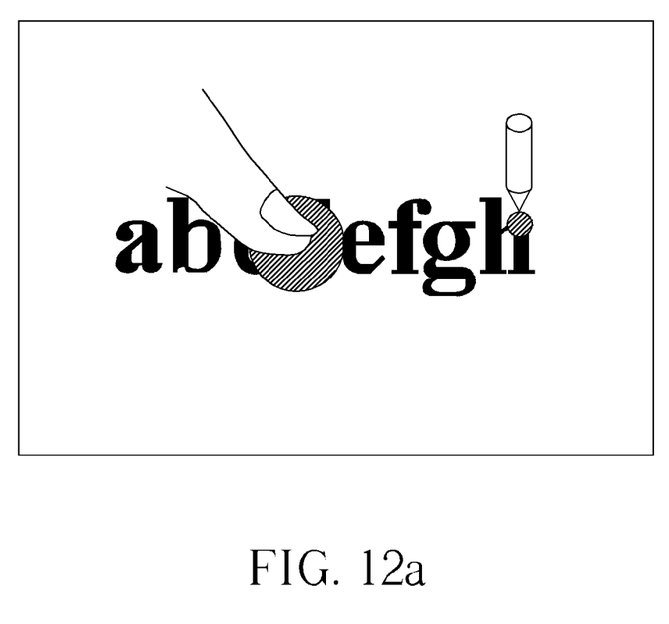
Figure 12B:
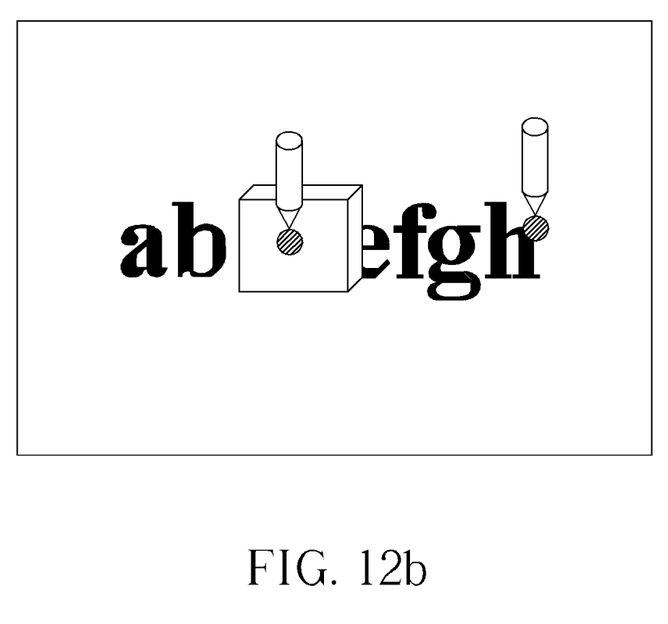

In the application depicted in FIGS. 12*a* and 12*b*, the second input device is used for writing words on the touch panel. Meanwhile, the first input device is used for deleting the words directly (as depicted in FIG. 12*a*) or using a specific object (as depicted in FIG. 12*b*). In this embodiment, the first command corresponds to dynamic deleting, the second command corresponds to dynamic inputting, and the second type gesture operation is related to data input/deletion.

Figure 13A:
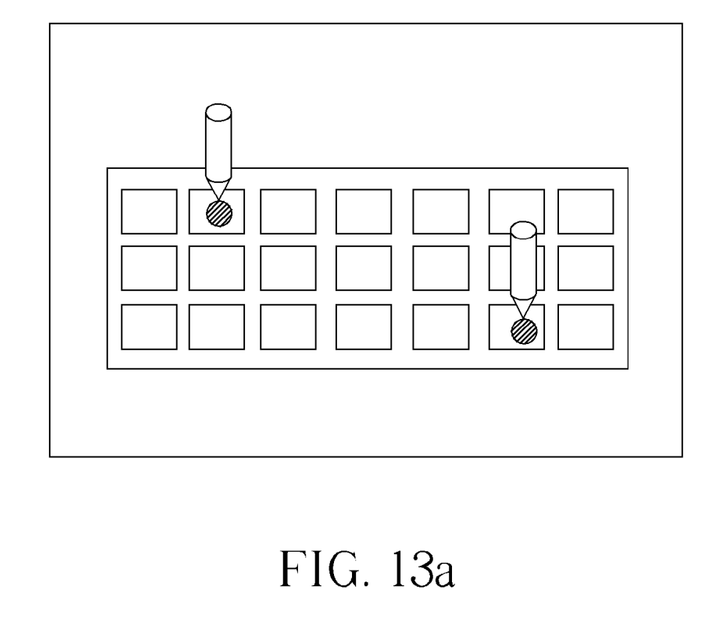
FIGS. 13a and 13b are diagrams illustrating the second embodiment of the present invention when performing a third type gesture operation.
Figure 13B:
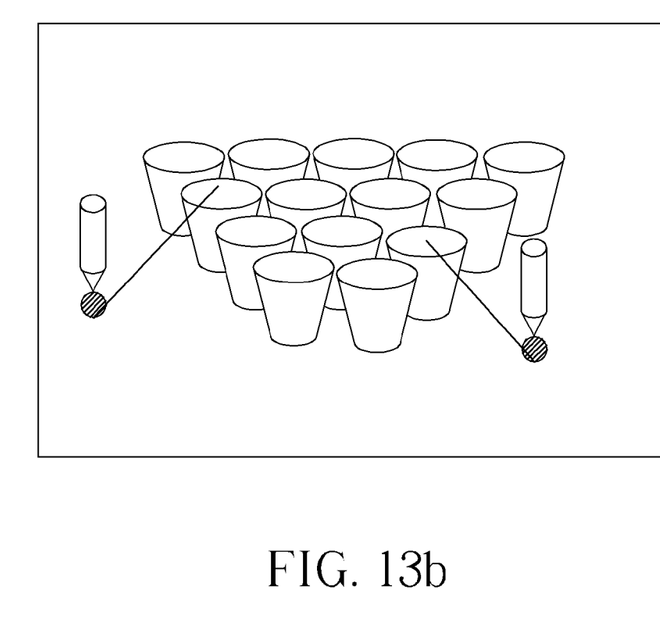

Referring to FIGS. 13*a*-13*a*, which are diagrams illustrating the second embodiment of the present invention when performing a third type gesture operation. For the second embodiment of the present invention to perform the third type gesture operation, a first command and a second command are alternatively issued to the touch panel using the first input device via a plurality of first contact points and the second input device via a plurality of second contact points, respectively. In other words, the first and second commands are both dynamic commands (such as multiple tap, quick tap or slow tap). By identifying the relationship between the first contact points and the second contact points, the corresponding third type gesture operation can be correctly executed.

For example, the application depicted in FIG. 13*a* is for manipulating an on-screen keyboard, in which the first and second input devices are used for inputting words. In this embodiment, the first and second commands both correspond to dynamic tapping and the third type gesture operation is related to data input. The application depicted in FIG. 13*b* is for playing a drum game, in which the first and second input devices are used for manipulating the drum sticks and controlling the volume of the drums with different tapping strength. In this embodiment, the first and second commands both correspond to dynamic tapping and the third type gesture operation is related to the number of taps, tapping speed or tapping strength.

In the present invention, a stylus which can be manipulated swiftly and a finger capable of performing various gesture operations are used as input devices of a resistive touch panel. Therefore, a wide variety of gesture operations can be accurately executed for providing multi-touch function. The embodiments illustrated in FIGS. 5*a*-13*a* and 5*b*-13*b* are for explanatory purposes and do not limit the scope of the present invention.

Those skilled in the art will readily observe that numerous modifications and alterations of the device and method may be made while retaining the teachings of the invention.

What is claimed is:
1. A multi-touch method comprising:
   issuing a first command by touching a touch panel using a first input device;

issuing a second command by touching the touch panel using a second input device while the first input device is in contact with the touch panel; and identifying the first and second commands for executing a corresponding gesture operation.

2. The method of claim 1, wherein the gesture operation is associated with motions, taps, selections or data inputs.

3. The method of claim 2, wherein the motions include sliding, deleting, rotating, shaping, enlarging or shrinking.

4. The method of claim 2, wherein the taps include multiple tap, quick tap or slow tap.

5. The method of claim 2, wherein the selections include selecting a specific region on the touch panel or selecting an object shown on the touch panel.

6. The method of claim 1, wherein the gesture operation comprises:

selecting an object shown on the touch panel according to the first command; and enlarging or shrinking the object according to the second command.

7. The method of claim 1, wherein the gesture operation comprises:

selecting an object shown on the touch panel according to the first command; and rotating the object according to the second command.

8. The method of claim 1, wherein the gesture operation comprises:

selecting an object shown on the touch panel according to the first command; and shaping the object according to the second command.

9. The method of claim 1, wherein the gesture operation comprises:

moving an object shown on the touch panel according to the first and second commands.

10. The method of claim 1, wherein the gesture operation comprises:

selecting all objects shown within a specific region on the touch panel according to the first and second commands.

11. The method of claim 1, wherein the gesture operation comprises:

selecting an object shown on the touch panel according to the first command; and inputting a message on the object according to the second command.

12. The method of claim 1, wherein the gesture operation comprises:

inputting a message on the touch panel according to the second command; and deleting the message shown on the touch panel according to the first command.

13. The method of claim 1, wherein the gesture operation comprises:

selecting an object shown on the touch panel according to the first command; and selecting a content of the object according to the second command.

14. The method of claim 1, wherein the first command is issued by touching a first contact point on the touch panel using the first input device, and the second command is issued by touching a second contact point on the touch panel using the second input device.

15. The method of claim 14, wherein the first contact point has a larger area than the second contact point.

16. The method of claim 1, wherein the first command is issued by touching a plurality of first contact points on the touch panel using the first input device, and the second command is issued by touching a plurality of second contact points on the touch panel using the second input device.

17. The method of claim 16, wherein each first contact point has a larger area than each second contact point.

18. The method of claim 1, wherein the first input device is a finger, and the second input device is a stylus.

19. The method of claim 1, wherein the first and second input device are styli.

20. The method of claim 1, wherein the touch panel is a resistive touch panel.

21. A multi-touch method comprising:

issuing a first command by touching a touch panel using a first mechanical device;

issuing a second command by touching the touch panel using a second mechanical device; and identifying the first and second commands for executing a corresponding gesture operation.

22. The method of claim 21, wherein the gesture operation is associated with motions, taps, selections or data inputs.

23. The method of claim 22, wherein the motions include sliding, deleting, rotating, shaping, enlarging or shrinking.

24. The method of claim 22, wherein the taps include multiple tap, quick tap or slow tap.

25. The method of claim 22, wherein the selections include selecting a specific region on the touch panel or selecting an object shown on the touch panel.

26. The method of claim 21, wherein the gesture operation comprises:

selecting an object shown on the touch panel according to the first command; and enlarging or shrinking the object according to the second command.

27. The method of claim 21, wherein the gesture operation comprises:

selecting an object shown on the touch panel according to the first command; and rotating the object according to the second command.

28. The method of claim 21, wherein the gesture operation comprises:

selecting an object shown on the touch panel according to the first command; and shaping the object according to the second command.

29. The method of claim 21, wherein the gesture operation comprises:

moving an object shown on the touch panel according to the first and second commands.

30. The method of claim 21, wherein the gesture operation comprises:

selecting all objects shown within a specific region on the touch panel according to the first and second commands.

31. The method of claim 21, wherein the gesture operation comprises:

selecting an object shown on the touch panel according to the first command; and inputting a message on the object according to the second command.

32. The method of claim 21, wherein the first command is issued by touching a first contact point on the touch panel using the first mechanical device, and the second command is issued by touching a second contact point on the touch panel using the second mechanical device.

33. The method of claim 21, wherein the first and second mechanical devices are styli.

34. The method of claim 21, wherein the touch panel is a resistive touch panel.

* * * * *